United States Patent Office 3,644,279
Patented Feb. 22, 1972

3,644,279
POLYMERS OF MONO-1-OLEFINS STABILIZED AGAINST DEGRADATION BY ULTRAVIOLET LIGHT
Ronald D. Mathis and Jack P. Guillory, Bartlesville, Okla., assignors to Phillips Petroleum Company
No Drawing. Filed Apr. 16, 1969, Ser. No. 816,819
Int. Cl. C08f 45/58, 45/60
U.S. Cl. 260—45.8 N          7 Claims

ABSTRACT OF THE DISCLOSURE

Carbazole, indole, a hydrocarbyl - substituted form thereof or an amide thereof is added to a monoolefin polymer to stabilize it against the effects of ultraviolet light. Di - n - octadecyl-3,5-di-tert-butyl-4-hydroxy benzyl phosphonate is used in combination with the ultraviolet light stabilizers.

---

This invention relates to polymers of mono-1-olefins which have been stabilized by incorporating therein a stabilizer effective to reduce degradation of the polymer which occurs on exposure to ultraviolet light.

It is well known that polymers of mono-1-olefins such as polyethylene and polypropylene are subject to degradation as is manifested by embrittlement of the polymers when they are exposed to sunlight or other sources of ultraviolet light. There are many chemical stabilizers which can be incorporated into the polymer, but the search for improved stabilizers continues. Many stabilizers, while effective in reducing the effects of ultraviolet light, present problems of their own, such as introducing color or otherwise changing the appearance or properties of the polymer which is stabilized. Some stabilizers are organometallic and these compounds tend to be reactive with other additives and complicate the overall problem of stabilizing polymers against the effects of heat, light, or surface active agents.

It has now been found that normally solid polymers of mono-1-olefins can be stabilized against the degradation which occurs on exposure to ultraviolet light by incorporating in the polymeric mixture a stabilizing amount of indole, carbazole, a hydrocarbyl-N- or ring-substituted form thereof, or an amide of either the indole, carbazole, or hydrocarbyl ring-substituted forms.

It is an object of this invention to provide a stabilized polymeric composition formed from a polymer of a mono-1-olefin. Another object is to provide an olefin polymer composition which has been stabilized against embrittlement caused by exposure to ultraviolet light. Other objects, advantages and features of this invention will be apparent to those skilled in the art from the following disclosure and claims.

While any normally solid polymer of mono-1-olefin having from 2 to 8 carbon atoms per molecule can be stabilized according to this invention, it is of particular value in stabilizing polypropylene. Other polymers which can be stabilized against the effects of ultraviolet light include polyethylene, poly-1-butene, poly-4-methyl-1-pentene, and copolymers of such mono-1-olefins either in block, graft, or random copolymerized form, and the like.

The polymers which are especially well adapted for stabilization by this invention are those polymers which are generally characterized as being highly crystalline as indicated by being insoluble in xylene at room temperature.

The stabilizing compounds which are used are indole, carbazole, hydrocarbyl-N- or ring-substituted forms of indole and carbazole in which the substituent groups contain a total of 1 to 20 carbon atoms, or amides of indole or carbazole or their hydrocarbyl substituted forms with carboxylic acids containing 1 to 26 carbon atoms. The hydrocarbyl substituents on the nitrogen or the rings of indole or carbazole can be alkyl, cycloalkyl, aryl, or combinations thereof. Such substituents do not affect the ability of the compound to stabilize against the action of ultraviolet light, but they do affect the melting point of the additive and to some extent its compatibility with the polymer. It is preferred, for ease of incorporation of the additive to the polymer, to use such compounds which contain no substituents or only 1 to 4 such substituents each having no more than 8 carbon atoms. Examples of such compounds would include 2-methylcarbazole, 3-n-propyl-5-phenylcarbazole, 4-benzylcarbazole, 3-cyclohexyl-6-phenylcarbazole, 2,4,5,7-tetra-n-pentylcarbazole, N-phenylcarbazole, 1,2-dimethylindole, and the like. In addition to N- or ring-substituted forms of these compounds, the amides of the indole or carbazole or their hydrocarbyl ring-substituted forms are also suitable for use. The amides are formed with carboxylic acids containing from 1 to 26 carbon atoms, preferably the fatty acids. Examples of such acid amides include N-laurylcarbazole, N-stearylindole, myristic acid amide of the 2-methylcarbazole, and formylcarbazole, and the like. Carbazole or its substituted or amide forms are preferred.

The amount of additive which is used depends upon the type of polymer and the application for which it is intended, for example, the severity of use, the necessity for continued flexibility of the polymer, the intensity of the exposure to ultraviolet light. The most desirable amount for any particular application can be readily determined by simple tests as outlined in the example described later in this disclosure.

It is preferred to use an amount of additive in the range of about 0.1 to 5 parts by weight per 100 parts of the polymer which is being stabilized. Other materials can also be incorporated in the composition, such as other stabilizers and antioxidants, fillers, pigments, plasticizers, and the like.

The stabilizing additive can be incorporated into the polymer in any manner so long as it is uniformly distributed through the polymeric composition. A suitable procedure involves simply dry blending the stabilizer in a subdivided form with powder or olefin polymer fluff, at which time any other additives can also be incorporated, and subsequently masticating the blend at elevated temperatures under which both the additive and the polymer are molten.

The additives which are used according to this invention have the advantage of presenting no color problem in the polymer and they do not introduce color themselves, so that the polymer can be left white or pigmented in any shade. In addition, the additives are not organometallic, so that problems which frequently accompany the use of organometals and their reactivity with other additives are avoided. The stabilized polymers can be used in any application for which plastics of this type are generally employed. One especially important use is in the formation of films or fibers which are subsequently used in the manufacture of outdoor carpeting.

To further illustrate the advantages of this invention, the following example is presented. The specific amounts and materials should be construed as being typical only and not to limit the scope of the invention.

EXAMPLE

Three compositions of highly crystalline polypropylene having a melt flow of about 3 were prepared by blending the polypropylene with 0.1 part by weight per 100 parts of the polymer with a thermal antioxidant, Irganox 1093.[1]

---

[1] Di-n-octadecyl - 3,5 - di-tert-butyl-4-hydroxybenzyl phosphonate.

In one of the compositions carbazole was incorporated, and into a second N-caprylyl carbazole, each at a level of 0.5 part by weight per 100 parts of the polymer. No ultraviolet stabilizer was added to the third. The three compositions were separately dry-blended and then each was masticated in a Brabender Plastograph at 200° C. for five minutes under a nitrogen atmosphere. After cooling, each composition was formed into films 5 mils thick by compression molding. Three samples of each composition were then exposed in a commercial Blacklight-Sunlight exposure device (available from American Ultraviolet Company) where they were subjected to intense ultraviolet exposure in an accelerated test, all under the same conditions of exposure. This is a standard test instrument used by the industry for this purpose. The samples were tested for failure every 20 hours of exposure by flexing each strip in a rolling motion so that each strip was subjected throughout its length to a bend of 180°. The results of the test for each sample of the three compositions is shown in the following table:

TABLE I

| | UV Additive | | |
|---|---|---|---|
| | None | Carbazole | N-caprylyl carbazole |
| Hours to failure | 100.0 | 280.0 | 280.0 |
| Do | 100.0 | 300.0 | 300.0 |
| Do | 120.0 | 300.0 | 340.0 |
| Average (hours) | 106.7 | 293.3 | 306.7 |

The above data show that the compositions containing the carbazole and N-caprylylcarbazole had approximately three times the life under exposure to ultraviolet light as the compositions containing only the antioxidant and no ultraviolet stabilizer.

We claim:
1. A composition of a normally solid polymer of a mono-1-olefin having 2 to 8 carbon atoms per molecule stabilized against degradation on exposure to ultraviolet light containing di-n-octadecyl-3,5-di-tert-butyl-4-hydroxy benzyl phosphonate and a stabilizing amount of a compound selected from indole, carbazole, a hydrocarbyl N- or ring-substituted form of indole or carbazole in which the substituent groups contain a total of 1 to 20 carbon atoms, or amides of indole or carbazole or their hydrocarbyl ring substituted form with carboxylic acids containing 1 to 26 carbon atoms.
2. A composition in accord with claim 1 wherein said carboxylic acid is a monocarboxylic acid.
3. A composition in accord with claim 1 wherein the ultraviolet light stabilizer is a compound selected from the class consisting of carbazole and N-caprylyl carbazole.
4. The composition in accord with claim 1 wherein said ultraviolet light stabilizing compound is carbazole, substituted carbazole containing 1 to 4 alkyl, cycloalkyl, or aryl groups or combinations thereof each having 1 to 8 carbon atoms and attached to the nitrogen or ring carbon atoms, or a monocarboxylic fatty acid amide of carbazole or said substituted carbazole.
5. A composition in accord with claim 3 wherein the polymer is polypropylene.
6. A composition in accord with claim 1 wherein the polymer is polypropylene and the ultraviolet light stabilizer is carbazole.
7. A composition in accord with claim 1 wherein the polymer is polypropylene and the ultraviolet light stabilizer is N-caprylyl carbazole.

References Cited

UNITED STATES PATENTS

| | | | |
|---|---|---|---|
| 1,836,702 | 12/1931 | Christmann | 260—800 |
| 2,037,932 | 4/1936 | Semon | 260—800 |
| 2,787,551 | 4/1957 | Bell et al. | 260—800 |
| 2,921,922 | 1/1960 | Harris | 260—45.8 |
| 2,960,488 | 11/1960 | Tamblyn et al. | 260—45.9 |
| 3,014,920 | 12/1961 | Dressler et al. | 260—315 |
| 3,352,771 | 11/1967 | Anspon | 260—45.8 |
| 3,406,144 | 10/1968 | Marshall | 260—45.8 |
| 3,454,524 | 7/1969 | Hansen | 260—45.8 |
| 3,454,586 | 7/1969 | Suh | 260—45.8 |

DONALD E. CZAJA, Primary Examiner

R. A. WHITE, Assistant Examiner

U.S. Cl. X.R.

260—45.95